United States Patent [19]
Krüger et al.

[11] 4,364,640
[45] Dec. 21, 1982

[54] ARRANGEMENT FOR BRIGHTNESS GAINS OF PASSIVE DISPLAY UNITS

[75] Inventors: Hans Krüger, Munich; Karl-Heinz Walter, Grafing, both of Fed. Rep. of Germany

[73] Assignee: Siemens Aktiengesellschaft, Berlin & Munich, Fed. Rep. of Germany

[21] Appl. No.: 162,161

[22] Filed: Jun. 23, 1980

[30] Foreign Application Priority Data

Jul. 4, 1979 [DE] Fed. Rep. of Germany ....... 2927100

[51] Int. Cl.³ .............................................. G02F 1/133
[52] U.S. Cl. ................................. 350/345; 250/467.1; 350/96.1
[58] Field of Search ..................... 350/345, 96.1, 96.15, 350/96.12, 96.2; 358/901; 250/462, 463, 467

[56] References Cited

U.S. PATENT DOCUMENTS

| | | | |
|---|---|---|---|
| 4,142,781 | 3/1979 | Baur et al. | 350/338 X |
| 4,236,791 | 12/1980 | Krüeger et al. | 350/345 |
| 4,240,711 | 12/1980 | Baur et al. | 350/345 |
| 4,264,124 | 4/1981 | Greubel et al. | 350/96.10 |

Primary Examiner—John K. Corbin
Assistant Examiner—David Lewis
Attorney, Agent, or Firm—Hill, Van Santen, Steadman, Chiara & Simpson

[57] ABSTRACT

A device for capturing, guiding and concentrating light for coupling out of an outlet window comprising at least one flexible foil of synthetic material containing a fluorescent substance for converting ambient light into fluorescent light and means for forming an outlet for the fluorescent light. The device can include a second and-/or a third flexible foil so that light going to the outlet windows passes through the second and third foils. In one embodiment, a pair of foils are arranged behind a liquid crystal display and each foil contains fluorescent material having a polarization plane extending at right angles to each other, an optical active layer is placed between the two foils which will rotate the direction of polarization and the means for forming an outlet is disposed on the outer surface of the one foil opposite from the liquid crystal cell so that a viewer sees the light modulated by the cell.

4 Claims, 5 Drawing Figures

ARRANGEMENT FOR BRIGHTNESS GAINS OF PASSIVE DISPLAY UNITS

BACKGROUND OF THE INVENTION

The present invention is directed to a device for capturing or entrapping, guiding and focusing light which utilizes a synthetic member containing a fluorescent material which scatters and converts ambient light into fluorescent light which can be subsequently coupled therefrom.

A passive display device, which has light valves and has a device including a fluorescent material for capturing, guiding and concentrating light for coupling out through outlet windows which are aligned with the light valves, is known and an example is disclosed in U.S. Pat. No. 4,142,781, which includes the disclosure of German Patent Application No. 25 54 226. As pointed out in this Patent, whose disclosure is incorporated by reference, a synthetic body in the design of a plate contains a fluorescent material and serves to increase the intensity of the passive display device, for example, a liquid crystal display. This plate for example will capture the ambient light, convert it into fluorescent light, and guide it to coupling out or exit windows, which are arranged in the surface of the plate in the pattern of the display segments. These coupling out windows or exit windows can be formed by notches, impressed pigment layers or roughening of the surface.

The plate with the light emitted through the outlet windows serves as a background illumination for a liquid crystal display. To provide a good readability for the display, the illuminous density of the device should be as great as possible.

SUMMARY OF THE INVENTION

The present invention is directed to providing a device which utilizes fluorescent particles to create fluorescent light from ambient light which device has an effective increase in the luminuous intensity and enables an increase in the brightness of the output coupled light. To accomplish these goals, the present invention is directed to a device for capturing, guiding and concentrating light for coupling out of an outlet window comprising at least one flexible foil of a synthetic material containing fluorescent substance for converting ambient light into fluorescent light and means for forming an outlet window for the fluorescent light. The device can utilize a single foil in which the outlet windows are formed on that foil or a plurality of foils which are interconnected at their edges so that the light in the first foil travels into the second foil and if a third foil is also present through the second foil and into the third foil where it is coupled out by the outlet window in the third foil. When a second foil is present, it can be either a transparent foil or also contain a fluorescent material such as a fluorescent material that will absorb a different wavelength and does not absorb the fluorescent light emitted by the fluorescent material of the first foil. When the third foil is present, then the first and second foils contain fluorescent materials.

The outlet window for coupling out light can be formed by light scattering pigments applied on the surface of one of the foils either alone or in conjunction with a second pigment layer which is on the opposite surface and has a light scattering pigment having a substantially less reflectivity than the pigments of the first mentioned pigment layer. The outlet window can also be formed by roughening a portion of the surface of the foils.

In one embodiment of the invention, a second foil is arranged to extend parallel to the first foil and the first and second foil will contain a fluorescent material having a polarization plane extending at right angles to each other. An optical active layer is interposed between the first and second foil for rotating the direction of polarization by 90°. The means for forming the outlet window will be disposed on the outer surface of one of the first and second foils facing away from a direction of viewing and aligned with the optical active material and a liquid crystal display will be arranged adjacent the outer surface of the other foil and aligned with the means for forming an outlet window so that light coupled by the outlet window passes through the liquid crystal cell to be modulated prior to being seen by the viewer.

DESCRIPTION OF THE PREFERRED EMBODIMENTS

Figure 1:
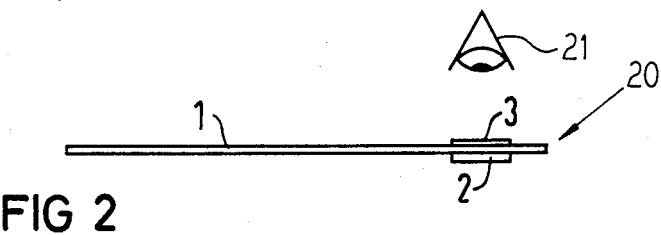
FIG. 1 is a side view schematically illustrating a flexible foil in accordance with the present invention.

The principles of the present invention are particularly useful in a device generally indicated at 20 in FIG. 1 for producing a brightness gain for a passive display. The device 20 will consist of a flexible synthetic foil 1 containing a fluorescent material, which will capture light, for example daylight, and convert it into fluorescent light. The fluorescent light is then guided in a known manner by means of total internal reflection in the interior of the foil and is output coupled at an exit or outlet window provided on the foil. As illustrated, this exit or outlet window is formed by a pigment layer 2, which is impressed or applied upon a surface of the foil which is not facing the viewer indicated by the eye 21. The pigment layer 2 can be, for example, titanium dioxide, barium sulfate, or also metallic particles such as aluminum, chromium, silver, gold, or platinum which are applied in the layer of a thickness of 10-50 μm. The foil can be made of a polymethyl-methacrylate of a thickness of 0.5 mm. Foils consisting of other materials having the same properties can also be employed. In order to amplify the brightness on the side of the light coupled by the outlet window 2, a second or additional pigment layer 3 is applied to the foil on an opposite side to the pigment layer 2. The layer 3 is substantially thinner than the pigment layer 2 and the reflection capability of the pigments of layer 3 must be substantially less than the pigment layer 2.

Instead of utilizing pigment layers such as the pigment layer 2 to form the outlet window, the foil can also be chemically or mechanically roughened up on a side not facing the viewer indicated by the eye 21. This roughened up surface can then be provided with a reflective layer, for example, by a vapor depositing a reflector thereon.

Figure 2:
FIG. 2 is a side view of an embodiment of the device utilizing a flexible foil in accordance with the present invention.

Another embodiment of the device is generally indicated at 20' in FIG. 2. In this embodiment, a first foil 1 and a second foil 4 are utilized. The two foils 1 and 4 have their edge surfaces abutting to another in a flush fashion to form a light transmissive interconnection. They can be interconnected for example by means of a bonding agent such as a cement which has the same index of refraction as the foils 1 and 4. The foil 4 can be transparent so that it only serves the purpose of guiding out the fluorescent light traveling therein to the means for forming the outlet window which is illustrated as the pigment layer 2 with the second pigment layer 3. Thus, light captured in the foil 1 is formed into fluorescent light and guided through the foils 1 and 4 and exits from the means forming the outlet window which is illustrated as the pigments 2 and 3. Such an arrangement provides an advantage when the output coupling is to be effected directly from the foil irradiated with fluorescent light.

It is possible to dope the foil 4 with a fluorescent material. Expediently, the foil 4 contains a fluorescent material that absorbs light of a different wavelength than that absorbed in the foil 1. Moreover, the fluorescent material of foils 1 and 3 must be so matched to each other, that the fluorescent light originating in the foil 1 is not absorbed in the foil 4. This arrangement can be designed for example so that the foil 1 absorbs artificial light of a specific wavelength whereas the foil 4 is designated for absorbing daylight.

Figure 3:
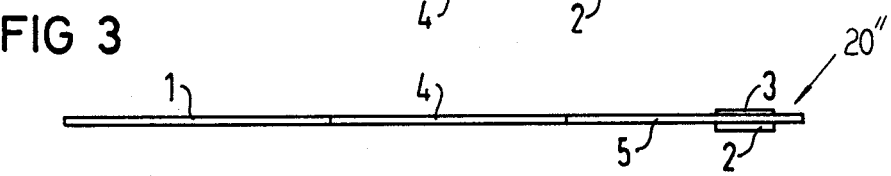
FIG. 3 is a side view of a second embodiment of the device utilizing the flexible foils.

Another embodiment of the device is generally indicated at 20'' in FIG. 3. In the device 20'', the two foils 1 and 4 are each absorbing light of a specific varying wavelength and are light transmissively interconnected together. The foil 4 has its edge light transmissively connected to a third transparent foil 5, which is provided for the purpose of guiding the fluorescent light from the foils 1 and 4 to the means for forming the outlet window. As in the previous embodiment, while the means for forming the outlet window can be of a different configuration, it is illustrated as the pigment layer 2 with the additional pigment layer 3.

Figure 4:
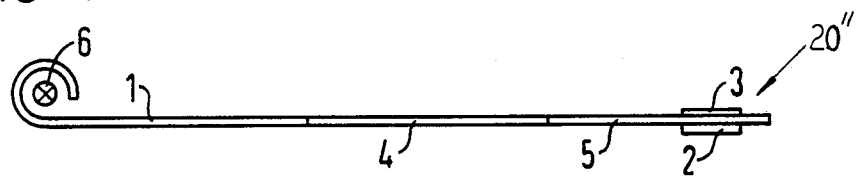
FIG. 4 is a side view of the embodiment of FIG. 3 in a special configuration.

The embodiment of the device illustrated in FIG. 3 is effectively employed for scales of the illuminations of an apparatus such as shown in FIG. 4. One end of the first foil will surround a small filament of an incandescent lamp 6 and capture its radiation. The fluorescent light stimulated by the light emitted by the lamp 6 is then guided through the foils 1, 4 and 5 to the pigment layer 2, which couples the light from the foil 5. As in the sample embodiment according to FIG. 3, the daylight is captured by the foil 4, which is provided with fluorescent material, and its fluorescent light is guided into the foil 5 to be output coupled by the pigment layer 2.

Figure 5:
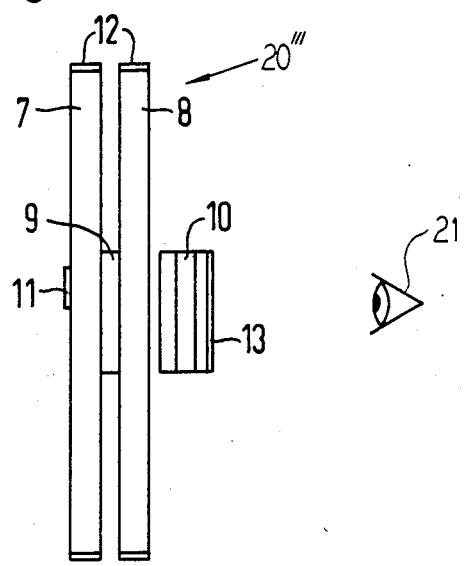
FIG. 5 is a side view of a fourth embodiment of the device of the present invention used with a liquid crystal cell.

Another embodiment of the device is generally indicated at 20''' in FIG. 5. The device 20''' is utilized with a liquid crystal cell or display 10 having a polarizer 13. As illustrated, the device 20''' has two flexible foils 7 and 8, each of which contain a fluorescent material which will emit a polarized fluorescent light with the direction of polarization of the light emitted in the foil 7 being at 90° relative to the direction of polarization of the light emitted in the foil 8. Between the foils 7 and 8, an optical active layer 9 for example, a liquid crystal polymer, is arranged and will rotate the plane of polarization of the polarized light emitted by the foil 7 through 90°. The light can then pass through the foil 8 and impinge on the liquid crystal display 10, which is provided in a known fashion with a polarizer 13. At least the foil 7 is provided with a light output coupling window, which may be a pigment layer such as the layer 11 which is aligned with the optical active material 9 and the liquid crystal cell 10. While the output window is illustrated as a layer 11, it can also be in the form of a notch or an indentation. However, the outlet window cannot be permitted to depolarize the fluorescent light or can only slightly depolarize the fluorescent light in a very weak manner. In order to increase the efficiency, the end faces of the foils such as 7 and 8 are provided with diffused reflectors 12 which have a distance of 1 or 2 $\mu$m from the end faces. This distance or spacing is adjusted virtually by itself due to the roughness of the directly applied reflective layer which for example, can consist of barium sulfate or titanium dioxide.

The advantage of the device 20''' is that the arrangement will provide a doubled brightness as compared with the arrangements with a single fluorescent plate.

Although various minor modifications may be suggested by those versed in the art, it should be understood that we wish to embody within the scope of the patent granted hereon, all such modifications as reasonably and properly come within the scope of our contribution to the art.

We claim:

1. A device for capturing, guiding and concentrating light for coupling out of an outlet window comprising a first flexible foil of a synthetic material containing a fluorescent substance for converting ambient light into polarized fluorescent light of a first direction, a second foil of synthetic material containing a fluorescent substance for converting ambient light into polarized fluorescent light of a second direction being arranged parallel to the first foil with said first and second directions extending at right angles to each other, an optical active layer interposed between said first and second foil for rotating the direction of polarization by 90°, and means for forming an outlet window for the fluorescent light being disposed on an outer surface of one of said first and second foils facing away from the direction of viewing and being aligned with said optical active material.

2. A device according to claim 1, wherein the means forming an outlet window comprises a light scattering pigment applied on the surface of said one foil.

3. A device according to claim 1, wherein the means for forming an outlet window comprises roughening up a portion of the surface of said one foil.

4. A device according to claim 1, which includes a liquid crystal display arranged adjacent the outer surface of the other foil and aligned with the means for forming an outlet window so that light coupled by the outlet window passes through the liquid crystal cell to a viewer.

* * * * *